United States Patent
Ishida et al.

(10) Patent No.: US 10,120,395 B2
(45) Date of Patent: Nov. 6, 2018

(54) GAS-FUEL-SUPPLY REGULATOR

(71) Applicant: NIKKI CO., LTD., Kanagawa-ken (JP)

(72) Inventors: Yukio Ishida, Kanagawa-ken (JP); Masanori Yasaki, Kanagawa-ken (JP)

(73) Assignee: Nikki Co., Ltd. (JP)

( * ) Notice: Subject to any disclaimer, the term of this patent is extended or adjusted under 35 U.S.C. 154(b) by 84 days.

(21) Appl. No.: 15/209,736

(22) Filed: Jul. 13, 2016

(65) Prior Publication Data
US 2017/0017244 A1  Jan. 19, 2017

(30) Foreign Application Priority Data
Jul. 14, 2015  (JP) .................. 2015-140664

(51) Int. Cl.
G05D 16/06 (2006.01)
F02M 21/02 (2006.01)
F16K 1/20 (2006.01)

(52) U.S. Cl.
CPC ..... G05D 16/0688 (2013.01); F02M 21/0239 (2013.01); F16K 1/2007 (2013.01); Y02T 10/32 (2013.01); Y10T 137/261 (2015.04); Y10T 137/783 (2015.04); Y10T 137/7831 (2015.04)

(58) Field of Classification Search
CPC ........... G05D 16/0688; G05D 16/0602; G05D 16/0683; G05D 16/0686; G05D 16/0694; F02M 21/0239; F16K 1/2007; Y02T 10/32; Y10T 137/783; Y10T 137/7831; Y10T 137/261
See application file for complete search history.

(56) References Cited

U.S. PATENT DOCUMENTS

| | | | | |
|---|---|---|---|---|
| 1,293,227 A | * | 2/1919 | Smyly | F16K 1/482 137/505.47 |
| 1,618,396 A | * | 2/1927 | Wilkins | G05D 16/0683 137/505.47 |
| 1,950,120 A | * | 3/1934 | McKee | G05D 16/0686 137/247 |
| 2,215,419 A | * | 9/1940 | Cheeseman | G05D 16/0683 137/484.4 |
| 2,263,581 A | * | 11/1941 | Hughes | G05D 16/0688 137/484.4 |

(Continued)

FOREIGN PATENT DOCUMENTS

JP  2003-232265 A  8/2003

OTHER PUBLICATIONS

English abstract for JP-2003-232265.

Primary Examiner — R. K. Arundale
Assistant Examiner — Patrick Williams
(74) Attorney, Agent, or Firm — Fishman Stewart PLLC

(57) ABSTRACT

A supporting member supporting a valve body includes a supporting member body having a semispherical bottom portion that makes contact with the top face of the valve body and a securing recess that is provided in the center and at a predetermined axial location to adjoin a through hole provided in the valve body, and a securing member including an engaging portion that has a form of a shaft having a predetermined diameter made of an elastic material and protrudes from a proximal end and a securing projection that swells out from a predetermined axial location of the shaft portion to fit into a securing recess provided in a through hole in the supporting member body.

4 Claims, 6 Drawing Sheets

(56) References Cited

U.S. PATENT DOCUMENTS

| | | | | |
|---|---|---|---|---|
| 3,339,581 A * | 9/1967 | Courtot | ............. | G05D 16/0683 |
| | | | | 137/505.46 |
| 3,960,126 A * | 6/1976 | Shinoda | ............. | F02M 21/0239 |
| | | | | 123/527 |
| 5,681,508 A * | 10/1997 | Gerhardy | ............... | F02M 17/04 |
| | | | | 137/505.46 |
| 7,219,689 B2 * | 5/2007 | Pollock | .............. | G05D 16/0655 |
| | | | | 137/495 |
| 8,695,629 B2 * | 4/2014 | Hsiao | ................ | G05D 16/0691 |
| | | | | 137/495 |

* cited by examiner

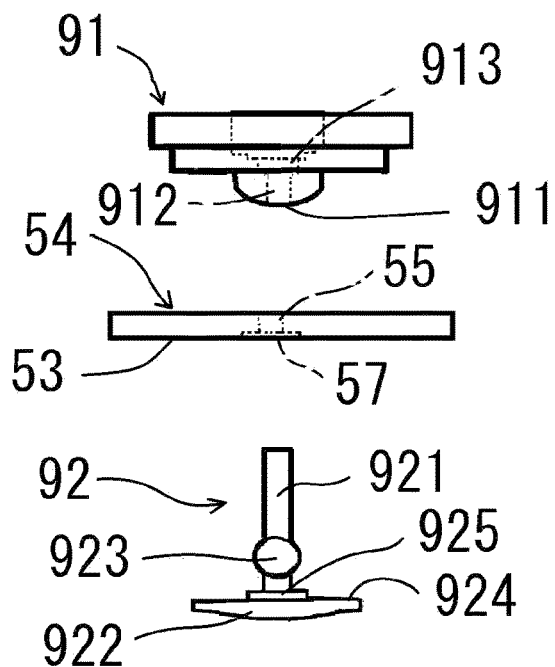
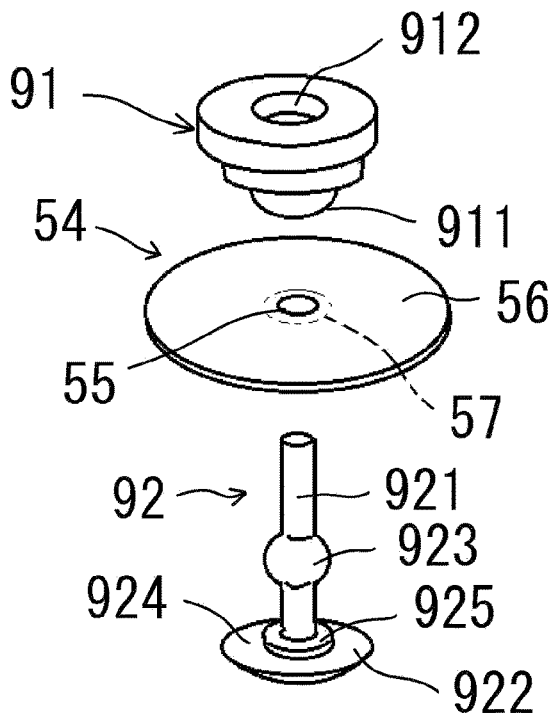
FIG.3A
FIG.3B

GAS-FUEL-SUPPLY REGULATOR

CROSS-REFERENCE TO RELATED APPLICATIONS

This application claims priority to Japanese Application No. JP2015-140664, filed Jul. 14, 2015, which is hereby incorporated by reference in its entirety.

TECHNICAL FIELD

The present invention is related to a gas-fuel-supply regulator that depressurizes a high pressure gas-fuel supplied from a pressure container, such as liquid petroleum gas (LPG) and compressed natural gas (CNG), to a predetermined pressure to supply the gas-fuel to a mixer or an injector.

BACKGROUND

Conventionally, when supplying a gas-fuel, such as LPG and CNG, to an engine, a high pressure gas-fuel liquidized and contained in a pressure container is depressurized by a regulator to a pressure as low as the atmospheric pressure, and the gas-fuel is supplied to a mixer or an injector and then to a gas engine via a suction pipe.

Pressure governing control on a gas-fuel by the regulator is disclosed, for example, in JP 2003-232265 A. As illustrated in FIG. 6, a valve 5 is provided at a fuel inlet 4 leading to a pressure adjusting chamber 3 which is separated by a diaphragm 2 from a back pressure chamber 1 communicating with the atmosphere, and a control-pressure adjusting spring 6 is provided to push the diaphragm 2 against the atmospheric pressure in the back pressure chamber 1. Back and forth displacements of the diaphragm 2 are transmitted by a valve lever 8 pivotally supported by a pin 7 to open and close the valve 5, and thereby the pressure is controlled.

As illustrated in FIGS. 7 and 8, the valve 5 of the gas-fuel-supply regulator includes a sleeve-like valve base 52 provided at the outlet of the fuel inlet 4 and having a rim on a top-opening that serves as a valve seat 51, and a disk-shaped valve body 54 that has a seating face 53 and closely seats on the valve seat 51. After the leakage rate adjusted for each product assembly, the valve body 54 is supported on the valve lever 8, which is pivotally supported by the pin 7 at a location close to the valve base 52, via a supporting member 9 bonded with an adhesive 82 to the valve lever 8.

This structure is however disadvantageous in that, by reassembly or replacement of the valve body 54, the preadjusted relative relationship between the valve body 54 and the valve base 52 may be lost and thus a specified sealing performance may not be maintained.

As a conventional solution to this problem, as illustrated in FIG. 8, for example, a valve 5 is proposed that includes a supporting member 9 having a semispherical bottom portion that contacts the valve body 54 in a manner allowing the relative motion of the valve body 54 to the supporting member 9 (the connected valve body 54 being allowed to pitch in any direction about the center of the valve body 54). The valve 5 adjusts by itself the tilt of the valve body 54, moved by the valve lever 8, to the valve base 52.

The self-adjusting valve 5 however is disadvantageous under a small opening of the valve body 54, that is, in a minimal flow rate range, where unstable seating of the valve body 54 deteriorates controllability of the valve 5 under a minimal pressure and the free motion of the valve body 54 causes unstableness and reduces reliability.

SUMMARY

The present invention is made to solve the problem of a valve of a conventional gas-fuel-supply regulator. An object of the present invention is to provide a gas-fuel-supply regulator that is capable of self-adjusting the relative position between a valve body and a valve base and can always provide stable seating of the valve body.

To solve the aforementioned problem, a gas-fuel-supply regulator according to the embodiment of the present invention includes a valve that opens and closes by pivoting of a valve lever pivotally supported by a pin, the pivoting being caused by back and forth displacements of a diaphragm pushed against an atmospheric pressure in a back pressure chamber by a control-pressure adjusting spring, a supporting member being joint to the valve lever to support a circular valve body that makes contact with a sleeve-like valve base provided on a fuel inlet leading to a pressure adjusting chamber separated by the diaphragm from the back pressure chamber communicating with an atmosphere. The supporting member supporting the valve body includes a supporting member body having a semispherical bottom portion that contacts a top face of the valve body and a securing recess that is provided in a center and at a predetermined axial location to communicate with a through hole provided in the valve body. The supporting member also includes a securing member including an engaging portion that has a form of a shaft having a predetermined diameter made of an elastic material and protrudes from a proximal end and a securing projection that swells out from a predetermined axial location of a shaft portion to fit into the securing recess provided in a through hole in the supporting member body. The valve body is attached to the supporting member by the engaging portion of the securing member and the securing projection by inserting the securing member in the through hole of the valve body and the through hole of the supporting member body from a bottom side of the valve body until the securing projection fits into the securing recess, where the supporting member body being placed on the valve body with the through holes adjoining at a center of the valve body and the supporting member body.

Likewise the conventional example illustrated in FIG. 9, the supporting member 9 according to the embodiment of the present invention includes a supporting member body having a semispherical bottom portion of the supporting member body that contacts the valve body in a manner allowing the relative motion of the valve body to the supporting member (the connected valve body being allowed to pitch in any direction about the center of the valve body). It goes without saying that the tilt of the valve body, moved by the valve lever, to the valve base is self-adjusted. The supporting member and the valve body are attached to each other by a shaft member having elasticity, so that even when the valve lever tilts against the valve seat of the valve base, the valve body pitches, bending the axis of the elastic securing member, along the spherical surface of the bottom portion of the supporting member body to be kept seated on the valve seat of the valve base.

This solves the conventional problem happening under a small opening of the valve, for example, unstable seating of the valve body deteriorating controllability under a minimal pressure, and a freely pitching valve body becoming unstable and reducing reliability.

Furthermore, according to the embodiment of the present invention, a valve body having improved sealing performance can be provided with low cost by providing a membrane made of elastic material on a top face of the engaging portion of the securing member in an integrated manner to cover a bottom face of the valve body beyond a region that seats on the valve seat of the valve base.

According to an embodiment of the present invention, a gas-fuel-supply regulator including a highly reliable valve that still keeps the pre-adjusted relationship between a valve body and a valve base to maintain a specific sealing performance after reassembly and replacement of a valve body and maintains stable seating of the valve body can be provided.

BRIEF DESCRIPTION OF DRAWINGS

FIGS. 3A and 3B are respectively a side view and a perspective view of a valve and a supporting member used in the embodiment illustrated in FIG. 1;

DETAILED DESCRIPTION

Figure 1:
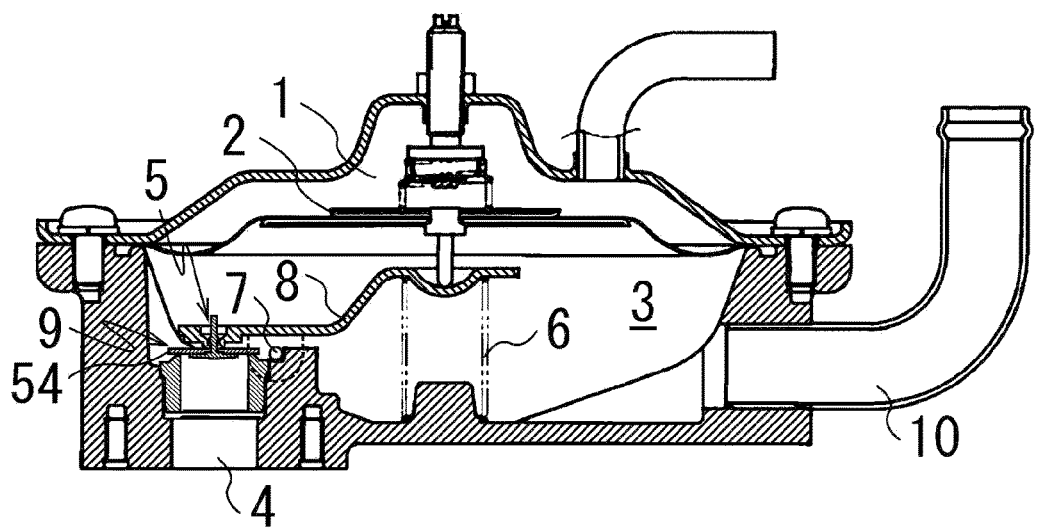
FIG. 1 is a schematic view illustrating a preferable embodiment according to the present invention.

Preferable embodiments of the present invention will now be described below in detail referring to the drawings.

Figure 6:
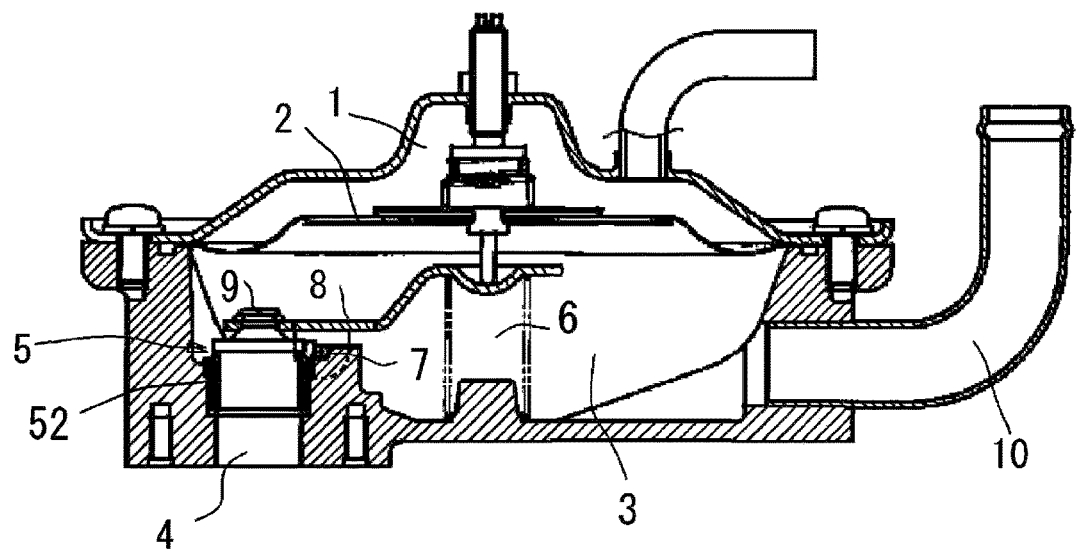
FIG. 6 is a schematic view illustrating a conventional example.
Figure 7:
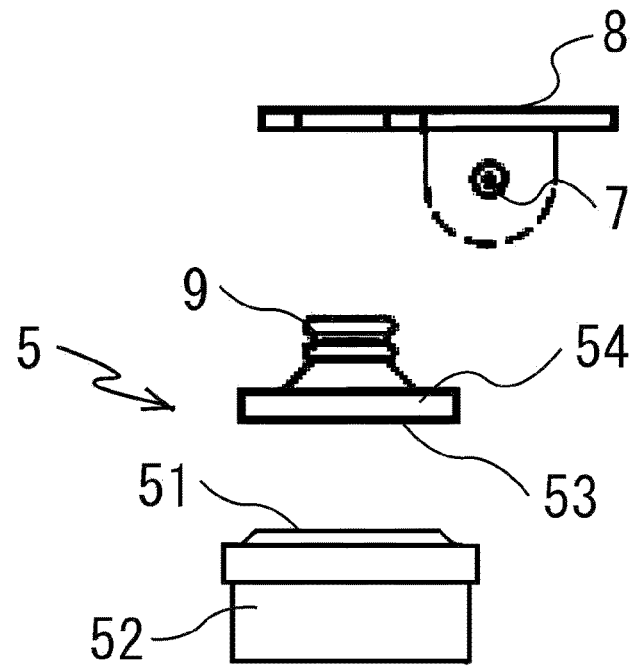
FIG. 7 is a side view of a valve used in the conventional example illustrated in FIG. 6.
Figure 8:
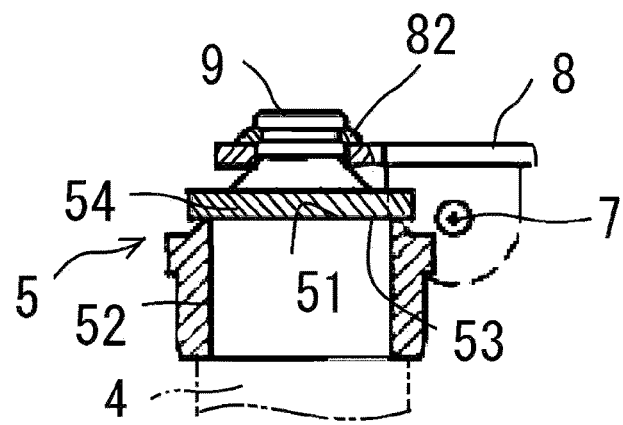
FIG. 8 is an enlarged sectional view illustrating an essential portion of the conventional example illustrated in FIG. 6.

FIGS. 1 to 4 illustrate a preferable embodiment of a fuel supplying device according to the present invention. The general structure of the device is approximately the same as the conventional example illustrated in FIG. 6. In the device, as illustrated in FIG. 1, a valve 5 is provided at a fuel inlet 4 leading to a pressure adjusting chamber 3 which is separated by a diaphragm 2 from a back pressure chamber 1 communicating with the atmosphere, and a control-pressure adjusting spring 6 is provided to push the diaphragm 2 against the atmospheric pressure in the back pressure chamber 1. Back and forth displacements of the diaphragm 2 are transmitted by a valve lever 8 pivotally supported by a pin 7 to open and close the valve 5 via a supporting member 9. By opening and closing of the valve 5, the gas-fuel, such as LPG and CNG, introduced from the fuel inlet 4, where the valve 5 is provided, is depressurized in the pressure adjusting chamber 3 to be as low as the atmospheric pressure. The gas-fuel is then ejected from the fuel outlet 10 to be supplied to a mixer or an injector and then to a gas engine via a suction pipe.

Figure 2:
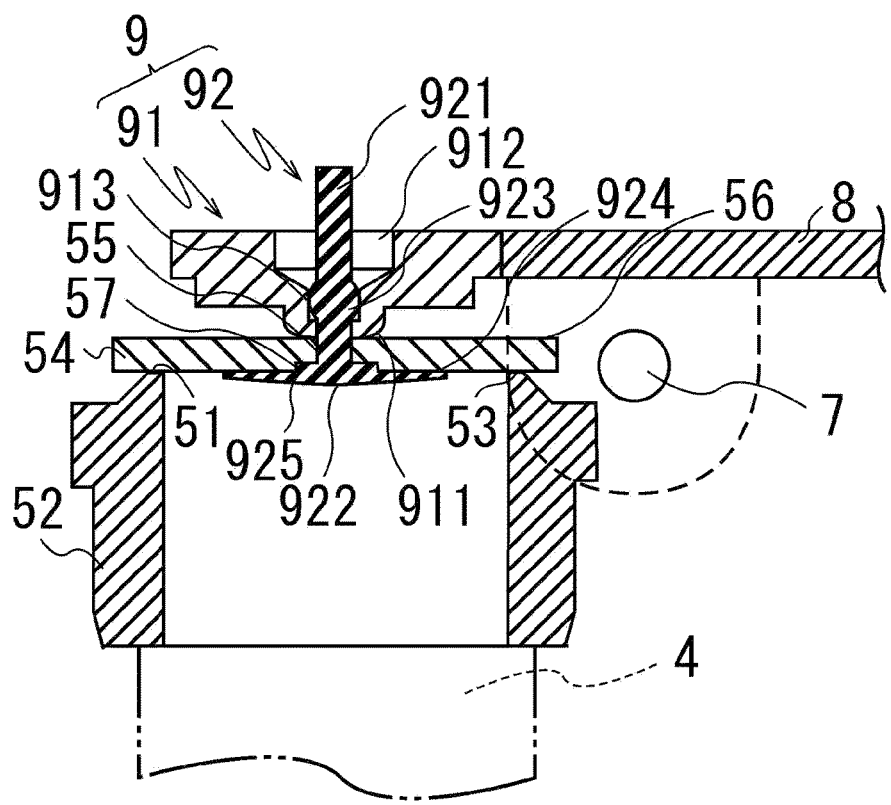
FIG. 2 is a partially enlarged sectional view illustrating an essential portion of the embodiment illustrated in FIG. 1.

The most significant feature of the embodiment is the valve 5. As illustrated in FIGS. 2 and 3, the valve 5 includes a sleeve-like valve base 52 provided at the outlet of the fuel inlet 4 and having a rim on the top-opening that serves as a valve seat 51, and a disk-shaped valve body 54 that has a seating face 53 and closely seats on the valve seat 51. A through hole 55 having a predetermined diameter is provided in the center of the valve body 54.

The supporting member 9 of the valve body 54 connects the valve body 54 to the valve lever 8 pivotally supported by the pin 7 to receive back and forth displacements of the diaphragm 2. The supporting member 9 includes a supporting member body 91 that is in contact with the top face 56 of the valve body 54 and jointed to the valve lever 8, and a securing member 92 that secures together the valve body 54 and the supporting member body 91.

The supporting member body 91 includes a semispherical bottom portion 911, a through hole 912 in the center adjoining the through hole 55 provided in the valve body 54, and a securing recess 913 at a predetermined axial location in the through hole 912.

The securing member 92 securing together the supporting member body 91 and the valve body 54 has a form of a shaft having a predetermined diameter and made of a suitable elastic material, such as rubber, having excellent oil resistance, wear resistance, aging resistance, and tear resistance, such as hard nytril butadiene rubber (NBR). A plate-like engaging portion 922 protrudes from the proximal end of a shaft portion 921. A securing projection 923 that fits into the securing recess 913 provided in the through hole 912 of the supporting member body 91 swells out from a predetermined axial location of the shaft portion 921.

The valve body 54 is attached to the supporting member 9 by inserting the securing member 92 in the through hole 55 of the valve body 54 and the through hole 912 of the supporting member body 91 from the bottom side (seating face 53) of the valve body 54 until the securing projection 923 fits into the securing recess 913, where the supporting member body 91 is placed on the valve body 54 with the through holes 55 and 912 adjoining at the center of the valve body 54 and the supporting member body 91.

Figure 9:
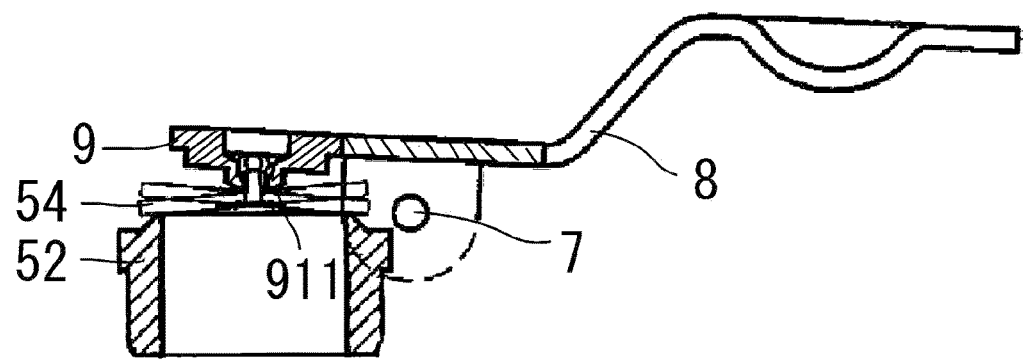
FIG. 9 is a partially enlarged sectional view illustrating an essential portion of another conventional example.

Likewise the conventional example illustrated in FIG. 9, the supporting member 9 of the embodiment according to the present invention includes the supporting member body 91 having the semispherical bottom portion 911 that contacts the valve body 54 in a manner allowing the relative motion of the valve body 54 to the supporting member 9 (the connected valve body 54 being allowed to pitch in any direction about the center of the valve body 54). It goes without saying that the tilt of the valve body 54 moved by the valve lever 8, to which the valve body 54 is jointed, to the valve base 52 is self-adjusted. The supporting member body 91 and the valve body 54 are connected to each other by the elastic securing member 92.

Figure 4:
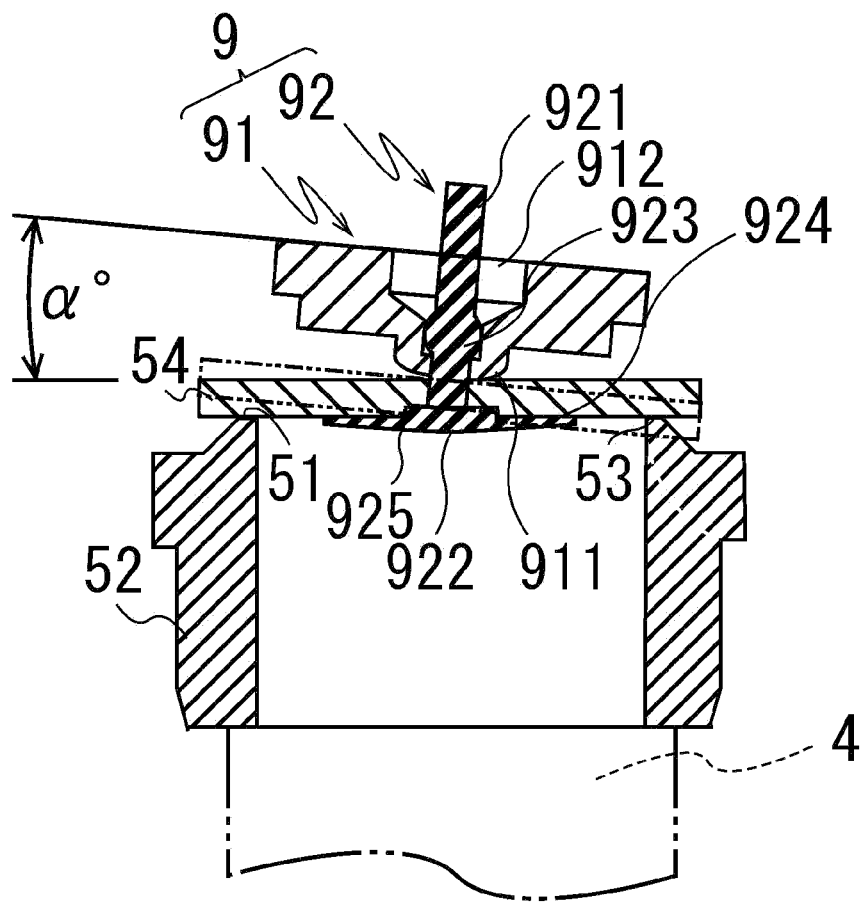
FIG. 4 is an explanatory view of an essential portion of the embodiment illustrated in FIG. 1 in use.

As illustrated in FIG. 4, even when the valve lever 8 tilts against the valve seat 51 of the valve base 52, the valve body 54 pitches, bending the axis of the elastic securing member 92, along the spherical surface of the bottom portion 911 of the supporting member body 91 to be kept seated on the valve seat 51 of the valve base 52.

This solves the conventional problem happening under a small opening of the valve 5, for example, unstable seating of the valve body 54 deteriorating controllability under a minimal pressure, and a freely pitching valve body 54 becoming unstable and reducing reliability.

Furthermore, in the embodiment, a column-shaped extended portion 925 is provided on the circumference of the shaft portion 921 on a top face 924 of the engaging portion 922 of the securing member 92, and a fitting recess 57 into which the extended portion 925 fits is provided in the seating face 53 of the valve body 54. The extended portion 925 fits into the fitting recess 57 to firmly secure together the valve body 54 and the securing member 92 in an integrated manner.

In the embodiment, the securing member 92 securing together the supporting member body 91 and the valve body 54 has rigidity and flexibility selected within such a range that, when the valve body 54 contacts the valve base 52 with a tilt angle ($\alpha°$ in FIG. 4), the securing member 92 is bent to completely and closely seat the valve body 54 on the valve base 52 by the force of the control-pressure adjusting spring 6 pushing the valve lever 8. The rigidity of the securing member 92 is selected considering, for example, the load on the control-pressure adjusting spring 6, the shaft diameter of the securing member 92, the position of the valve body 54, and the shape and attached position of the valve lever 8.

Figure 5:
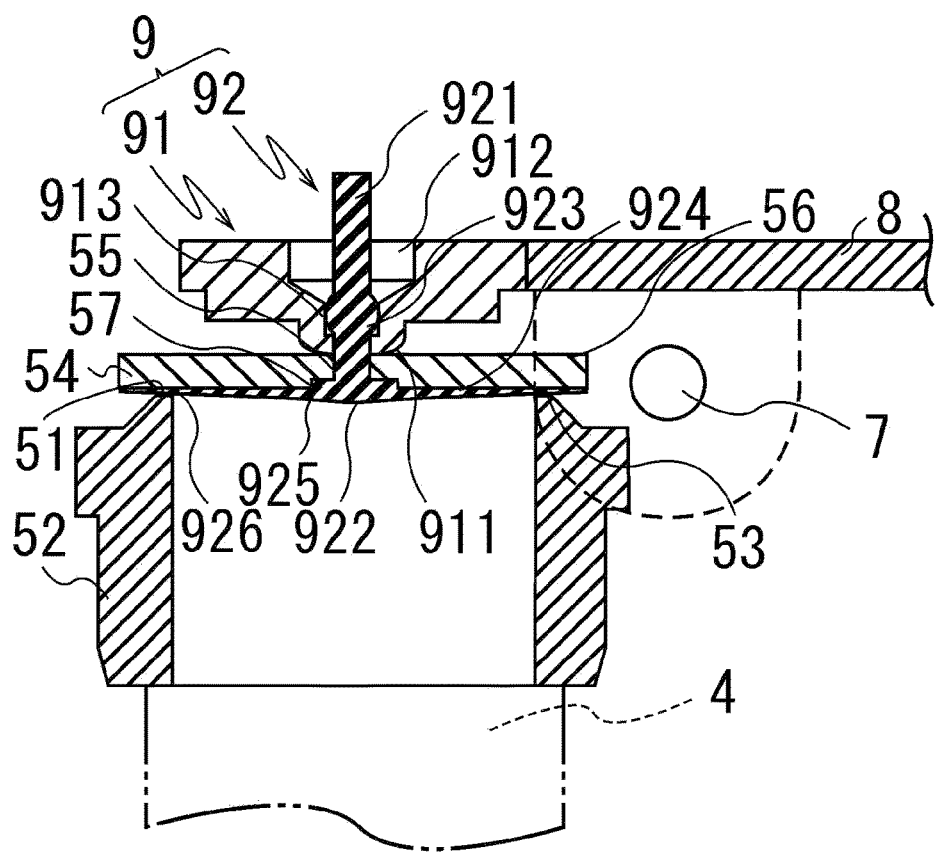
FIG. 5 is a partially enlarged sectional view illustrating an essential portion of another embodiment according to the present invention.

FIG. 5 illustrates another embodiment that has approximately the same general structure and effect as the embodiment illustrated in FIGS. 1 to 4, except that a membrane 926 made of elastic material is integrally provided on the top face 924 of the engaging portion 922 of the securing member 92 to cover the bottom face of the valve body 54 beyond the region that seats on the valve seat 51 of the valve base 52.

According to the embodiment, a valve body having improved sealing performance can be provided with low cost.

What is claimed is:

1. A gas-fuel-supply regulator comprising
a valve that opens and closes by pivoting of a valve lever pivotally supported by a pin, the pivoting being caused by back and forth displacements of a diaphragm pushed against an atmospheric pressure in a back pressure chamber by a control-pressure adjusting spring, a supporting member being joined to the valve lever to support a circular valve body that makes contact with a sleeve-like valve base provided on a fuel inlet leading to a pressure adjusting chamber separated by the diaphragm from the back pressure chamber communicating with an atmosphere, the sleeve-like valve base including a valve seat,
wherein the supporting member includes a supporting member body having a protruding semispherical bottom portion that contacts a top face of the valve body and a securing recess that is provided in a center and at a predetermined axial location to communicate with a through hole provided in the valve body, and a securing member including an engaging portion that has a form of a shaft having a predetermined diameter made of an elastic material and protrudes from a proximal end and a securing projection that swells out from a predetermined axial location of a shaft portion to fit into the securing recess provided in a through hole in the supporting member body,
wherein the valve body is attached to the supporting member by the engaging portion of the securing member and the securing projection by inserting the securing member in the through hole of the valve body and the through hole of the supporting member body from a bottom side of the valve body until the securing projection fits into the securing recess, the supporting member body being placed on the valve body with the through holes adjoining at a center of the valve body and the supporting member body, and
wherein the securing member elastically attaches the supporting member and the valve body, such that in response to the valve lever tilting against the valve seat of the sleeve-like valve base, the valve body pitches, bending an axis of the elastic securing member, along a spherical surface of the protruding semispherical bottom portion of the supporting member body while the supporting member body remains seated on the valve seat of the valve base.

2. The gas-fuel-supply regulator according to claim 1, wherein
a membrane made of elastic material is integrally provided on a top face of the engaging portion of the securing member to cover a bottom face of the valve body beyond a region that seats on the valve seat of the valve base.

3. The gas-fuel-supply regulator according to claim 1, wherein the elastic material is made of a hard rubber material.

4. The gas-fuel-supply regulator according to claim 2, wherein the elastic material is made of a hard rubber material.

* * * * *